US 6,700,928 B1

(12) United States Patent
Primich

(10) Patent No.: US 6,700,928 B1
(45) Date of Patent: Mar. 2, 2004

(54) TETRAHEDRON MODEM

(75) Inventor: Mark T. Primich, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/569,248

(22) Filed: May 11, 2000

(51) Int. Cl.⁷ .............................................. H04B 801/38
(52) U.S. Cl. ...................... 375/222; 375/261; 375/302; 375/298
(58) Field of Search ................................. 375/261, 264, 375/279, 284, 298, 302, 308, 322, 324, 329, 333, 222

(56) References Cited

U.S. PATENT DOCUMENTS

| 4,281,412 A | | 7/1981 | Wissel et al. |
|---|---|---|---|
| 4,613,976 A | | 9/1986 | Swerinson et al. |
| 4,644,565 A | | 2/1987 | Sen et al. |
| 4,713,817 A | * | 12/1987 | Wei .............................. 714/758 |
| 4,720,839 A | | 1/1988 | Feher et al. |
| 4,730,344 A | | 3/1988 | Saha |
| 4,843,615 A | | 6/1989 | Davis |
| 4,873,701 A | * | 10/1989 | Tretter ......................... 375/245 |
| 4,945,312 A | | 7/1990 | Auger et al. |
| 5,029,185 A | * | 7/1991 | Wei ............................. 375/245 |
| 5,633,893 A | | 5/1997 | Lampe et al. |
| 5,812,604 A | | 9/1998 | Herbst et al. |

FOREIGN PATENT DOCUMENTS

| FR | 2 606 233 A1 | 5/1988 |
|---|---|---|
| FR | 2606233 A1 * | 5/1988 |

OTHER PUBLICATIONS

Hsu, David Y., "Relations Between Dilutions of Precision and Volume of the Tetrahedron Formed by Four Satellites," Nov. 4, 1994 p. 669–676.

George R. Welti & Jhong S. Lee ; Digital Transmission with Coherent Four–Dimensional Modulation; IEEE Transactions on Information Theory, vol. IT–20, No. 4, Jul. 1974; (6 pages).

L.H. Zetterberg & H. Brandstrom; Codes for Combined Phase and Amplitude Modulated Signals in a Four–Dimensional Space; IEEE Transactions on Communications, vol. Com–25, No. 9, Sep. 1977; (8 pages).

A. Gersho & Victor B. Lawrence; Multidimensional Signal Constellations for Voiceband Data Transmission; IEEE Journal on Selected Areas in Communications, vol. SAC–2, No. 5, Sep. 1984; (16 pages).

Bernard Sklar; Digital Communications, Fundamentals and Appications; (pp. 412–415).

* cited by examiner

Primary Examiner—Amanda T. Le
(74) Attorney, Agent, or Firm—Harness Dickey & Pierce P.L.C.

(57) ABSTRACT

A tetrahedron modem phase modulates input serial binary data and demodulates input waveforms based on a four dimensional vector set. The phase modulation scheme has four possible state vectors (or symbols), that form a tetrahedron in four dimensional space. This symbol geometry improves the bit error rate performance over conventional PSK methods for a given signal to noise ratio. In addition the tetrahedron modem aids bit synchronization and eliminates phase ambiguity in the receiver. Lastly, the tetrahedron modulator outputs a constant envelope waveform, which may be subjected to non-linear devices and channels without fear of negative effects due to amplitude distortion.

20 Claims, 5 Drawing Sheets

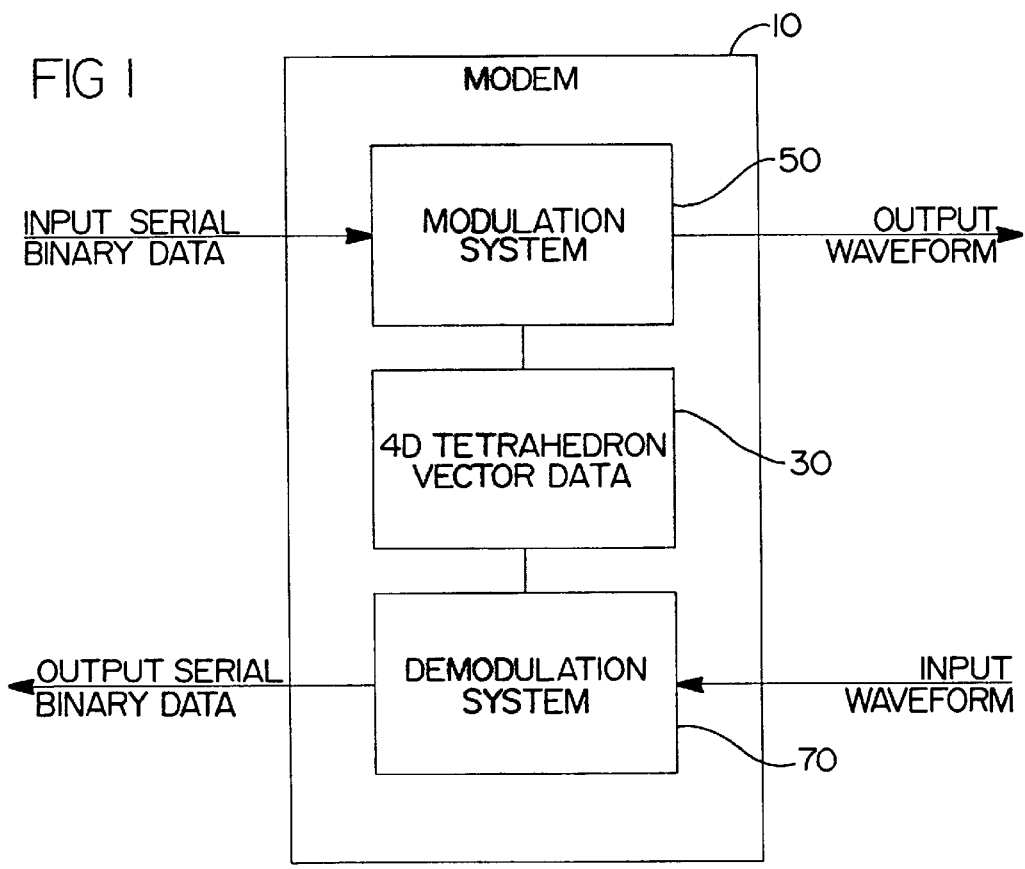
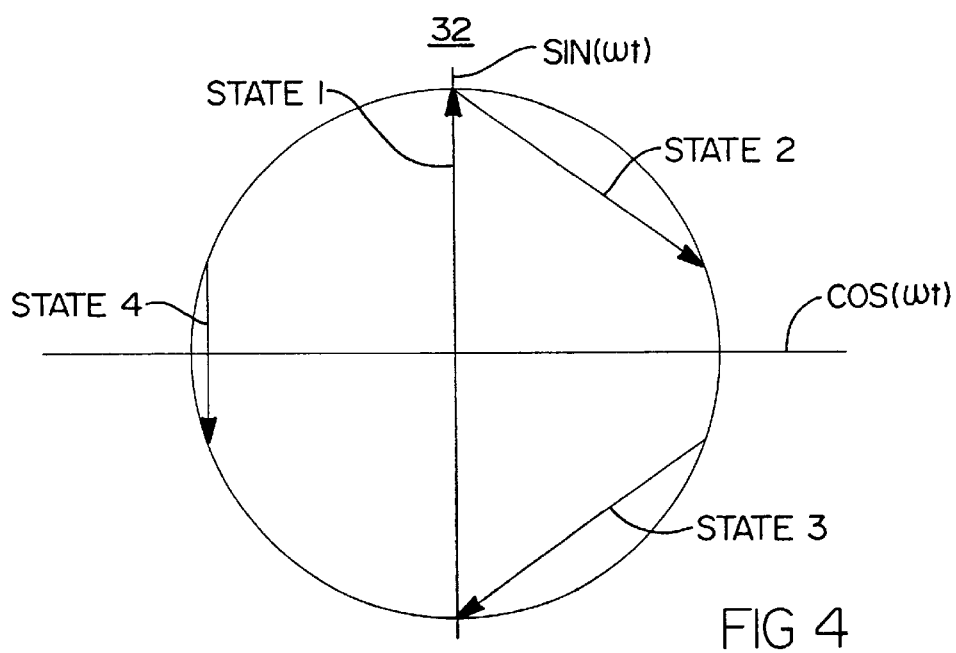

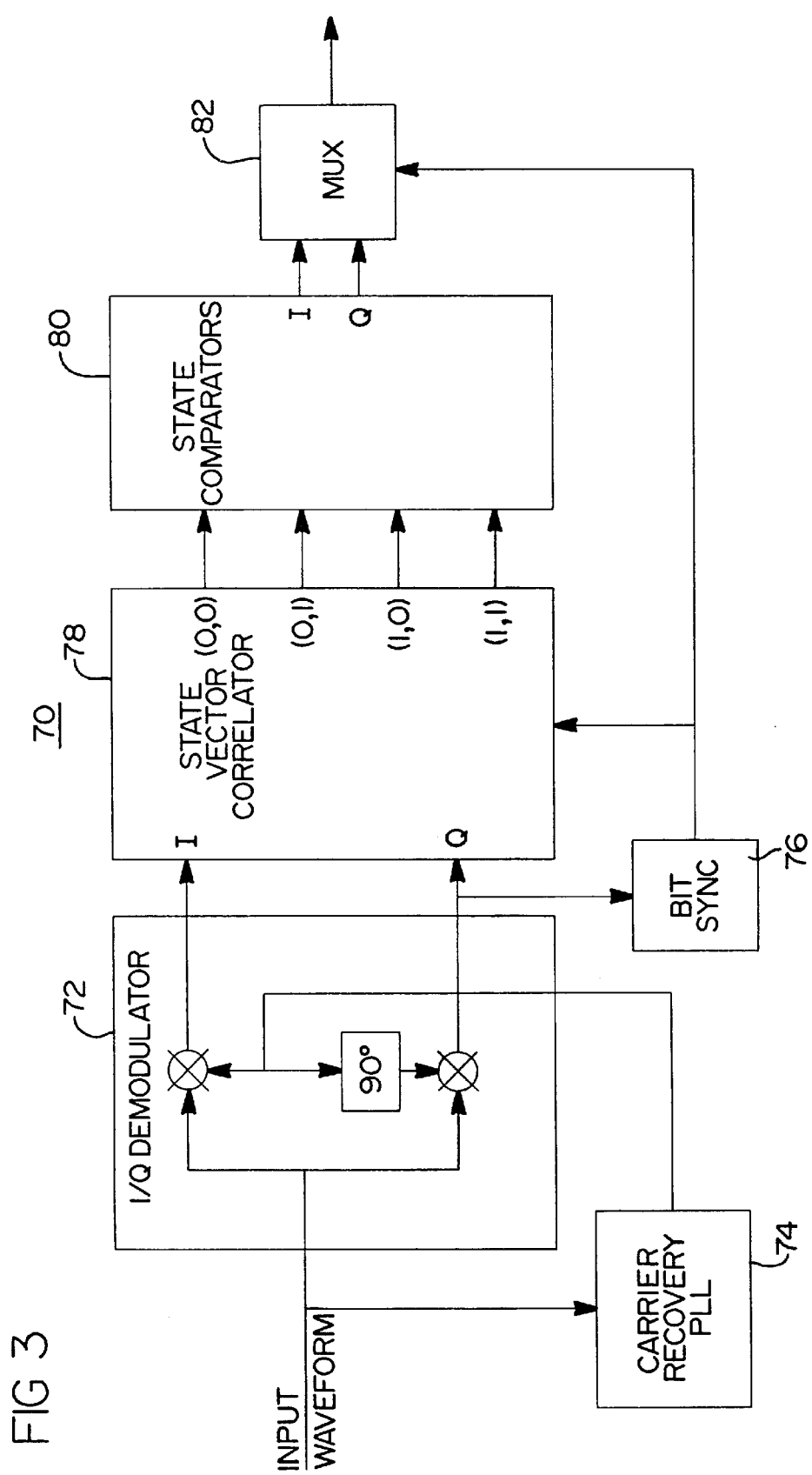

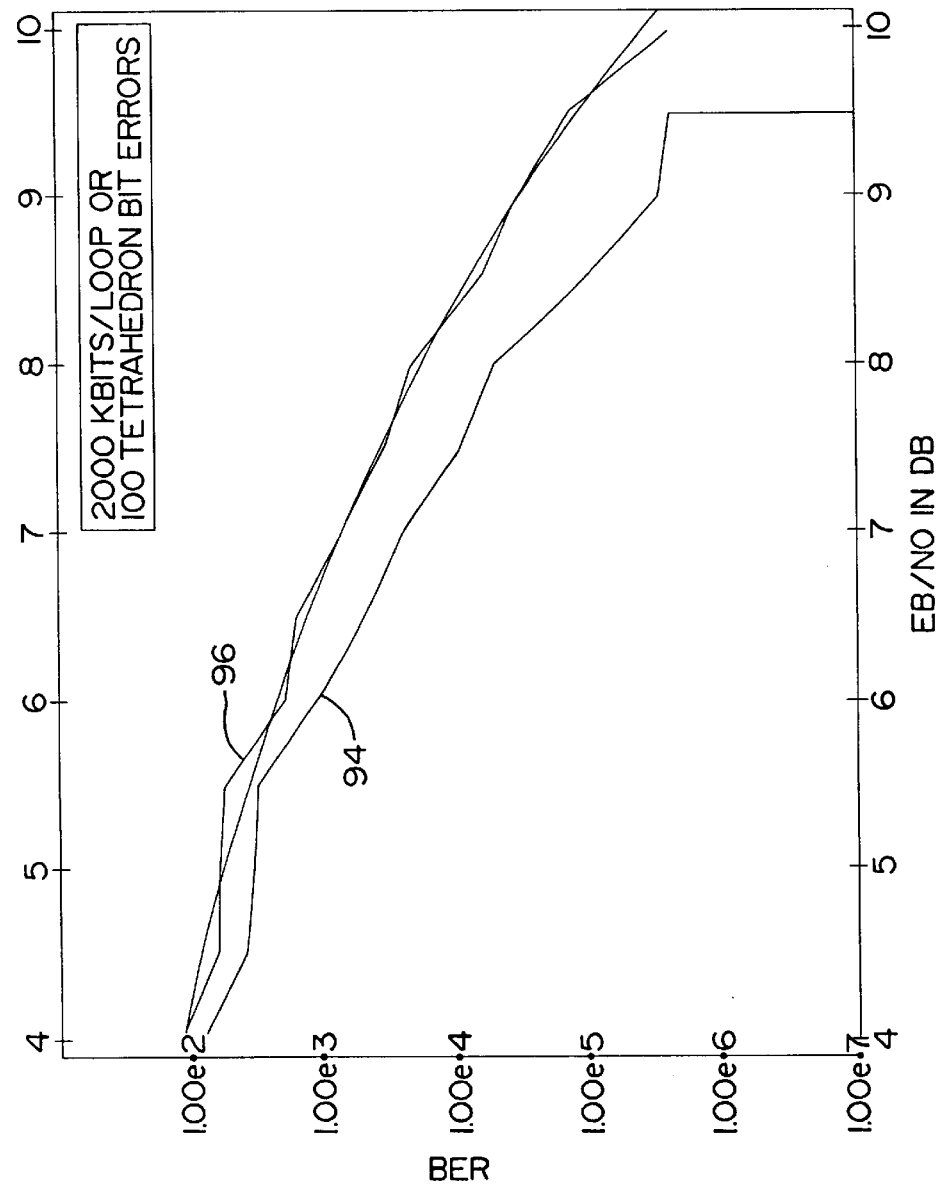

TETRAHEDRON MODEM

TECHNICAL FIELD

The present invention relates generally to modems. More particularly, the invention relates to a modem that generates modulated waveforms and serial binary data based on state vectors that form a tetrahedron in four dimensional space.

BACKGROUND ART

Modulator/demodulators (modems) have been in use for years, and are essential components in most communication systems, including digital radios. The primary modulation task of phase shift keying (PSK) modems is to convert input serial binary data into an output waveform that is modulated to discrete phase angles. The resultant phase states (or symbols) are essentially a representation of the binary data in the phase domain. Similarly, these modems demodulate by converting an input phase modulated waveform into output serial binary data. The basis for converting between the binary data and the waveform symbols is often termed the modulation "scheme" or "technique" and typically dictates the applicability is of a modem to a given application.

In transmitting digital radio signals, most satellite communication systems utilize constant envelope (or constant amplitude) modulating techniques. Constant envelope techniques are common because saturating high power amplifiers are typically used in these applications and it is desirable to minimize signal distortion. Characteristically, saturating high power amplifiers are more efficient than linear amplifiers, and amplitude based modulation schemes, such as quadrature amplitude modulation (QAM), have difficulty coping with the non-linearity of these amplifiers.

Furthermore, while many constant envelope modulation techniques have evolved such as bi-polar phase shift keying (BPSK), quadrature phase shift keying (QPSK), and variants thereof, methods for improving bit error rate (BER) for a given channel bandwidth remains a topic of intense study in the communications field.

While the above modulation techniques have become standard methods for communicating data, some factors reduce their desirability with respect to digital radio transmissions. For example, unencoded PSK signals have an inherent phase ambiguity that the receiver must resolve. This can be avoided by using a differentially encoded PSK waveform (i.e. mark or space encoded rather than level); unfortunately, this doubles the theoretical BER for a given signal to noise ratio.

Another problem relates to bit synchronization. Specifically, digital communication receivers must establish bit synchronization with the recovered waveform to properly detect data. This is done by tracking symbol transitions. For a non-return-to-zero (NRZ) encoding scheme, however, there may be times when the incoming signal does not have enough transitions to maintain tight bit synchronization. This can lead to a high BER or even temporary loss of bit synchronization. It is therefore desirable to provide a modulation scheme that ensures a phase transition during each symbol period to aid bit synchronization and detection. Bi-phase (a.k.a. Manchester) codes are sometimes used to aid bit synchronization in the demodulator. This is done by ensuring a phase transition during each bit period by encoding the clock onto the data. Bi-phase codes, however, decrease the throughput of a BPSK signal by ½ (i.e. the throughput of a bi-phase waveform is equal to ¼ bits per second/Hz). Scrambling the signal is another approach to ensure enough symbol transitions for adequate bit synchronization, but this approach adds complexity and requires synchronization which is often undesirable or even unacceptable due to delays that occur while the scrambling code is being acquired. There are various encoding schemes that are used to improve the BER of standard BPSK and QPSK links (such as convolutional encoding/Niterbi decoding, or block encoding). However, these approaches typically add complexity and cost to the communication system, and decrease the transmission throughput. Although forward error correction (FEC) encoding can be used to resolve the PSK waveform ambiguity, it requires additional detector control software and synchronization time.

The throughput (bandwidth efficiency) of a modulation scheme is often a major consideration when designing for band limited channels. Unfortunately, techniques used to improve the BER or aid bit synchronization, such as those described above, typically lower the channel throughput. It is therefore desirable, if possible, to provide a modulation scheme that improves BER and aids bit synchronization without degrading throughput. Furthermore, it is also desirable that the modulation scheme produce a constant envelope waveform, which enables transmission through non-linear devices such as saturating amplifiers commonly found in satellites. Lastly, it is desirable to have a modulation scheme that is not phase ambiguous.

SUMMARY OF THE INVENTION

The above objectives are provided by a system and method in accordance with the present invention for phase modulating data and demodulating input waveforms. A tetrahedron modem includes a modulation system that converts data into phase modulated symbols based on a state vector set. The demodulation system converts the phase modulated waveform back into the original data based on coherent detection of these symbols. The vectors that describe the symbol states are selected to form a tetrahedron in four dimensional space, which ultimately improves the BER for a given SNR. In addition, throughout this process the modulated waveform maintains a constant envelope, which permits the use of non-linear devices such as saturating amplifiers without signal distortion.

In accordance with the present invention, a method for creating a plurality of dimensions is described. The approach taken here is to utilize the symbol clock along with the inphase (I) and quadrature (Q) signals from the carrier local oscillator to generate the four required dimensions. A state vector set is defined such that the modulating symbols form a tetrahedron within this four dimensional space. The modulation manifests itself as a constant amplitude signal with specific phase angles and transitions based on the state vector set.

The present invention also provides a method for demodulating a phase modulated waveform. The method includes the step of creating a plurality of dimensions similar to that found in the modulator. Demodulation vectors are defined to allow coherent detection of the tetrahedral waveform within the four dimensional space. The phase angles and transitions are converted into data based on this vector set.

BRIEF DESCRIPTION OF THE DRAWINGS

The various advantages of the present invention will become apparent to one skilled in the art by reading the following specification and subjoined claims and by referencing the following drawing in which:

FIG. 1 is a block diagram of a tetrahedron modem in accordance with a preferred embodiment of the present invention;

FIG. 3 is a block diagram of a modem demodulation system in accordance with the present invention;

FIG. 4 is a phasor diagram of the states associated with a vector set in accordance with the present invention;

FIG. 6 is a plot demonstrating simulated bit error rate performance of the tetrahedron modem of the present invention in comparison to a simulated BPSK modem.

DETAILED DESCRIPTION OF THE PREFERRED EMBODIMENTS

Figure 2:
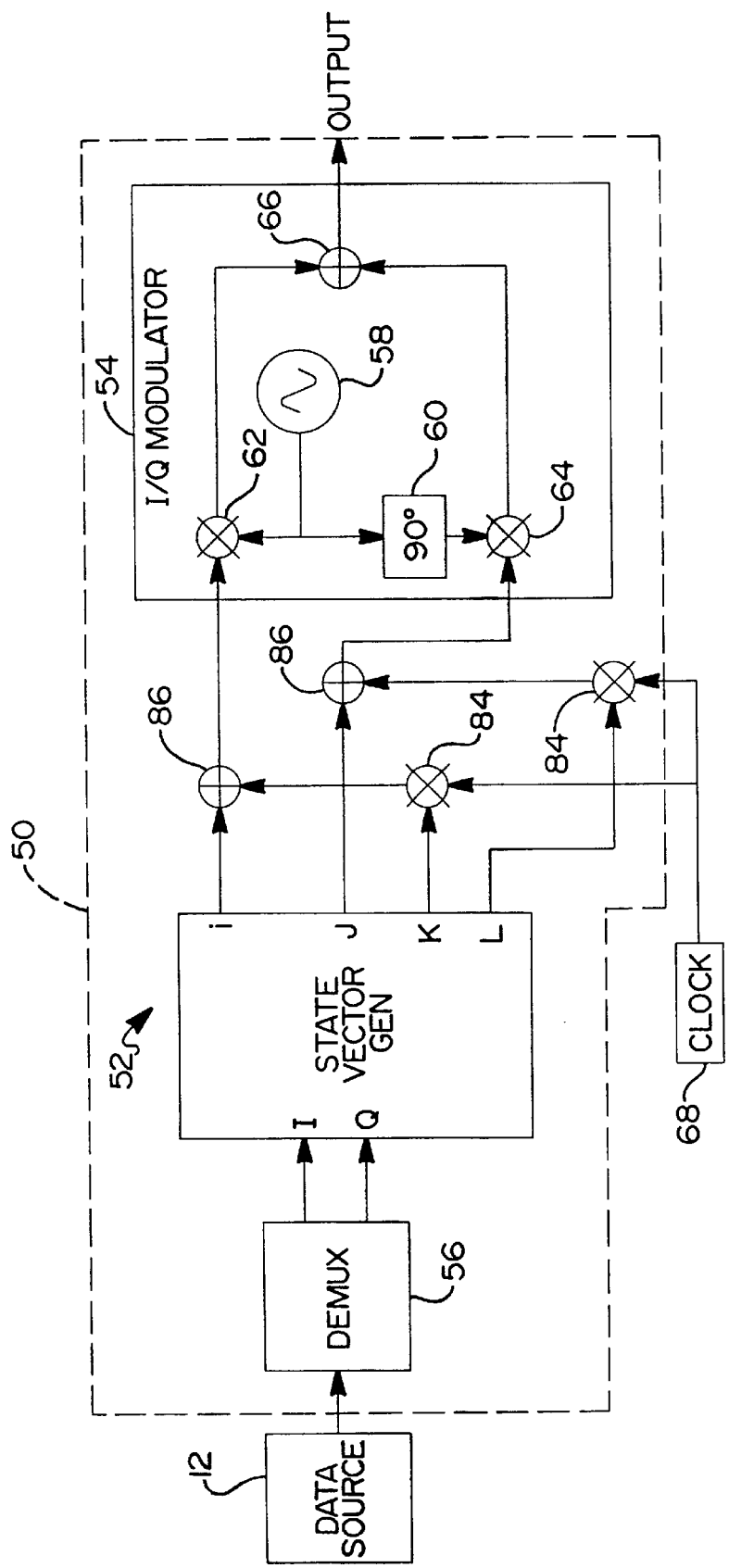
FIG. 2 is a block diagram of a modem modulation system in accordance with the present invention.

In FIG. 1, a tetrahedron modem 10 in accordance with a preferred embodiment of the present invention utilizing four dimensional tetrahedron vector data 30 to convert between serial binary data and modulated waveforms, is shown. Specifically, it can be seen that the modem 10 has a modulation system 50 for converting the input data into phase modulated symbols based on a state vector set. As will be discussed below, the modulation system 50 relies on the vector data 30 to define the state vectors in the state vector set. The vector data 30 contains information regarding the four unit vectors that define the possible signal dimensions, and the vector coefficients that specify the dimensional weighting for each symbol state. The output waveform is modulated to various phase states resulting from the tetrahedron-based conversion. These phase states are a direct function of the vector data 30. A demodulation system 70 converts an input waveform having sequential phase transitions into output serial binary data, where the demodulation conversion is based on the state vector set. Here, the demodulation vector set is also based on the vector data 30. The output serial binary data contains state transitions that result from the demodulation conversion. As already noted, the vector data 30 determine symbol states that form a tetrahedron in four dimensional space. Performing the conversions on the basis of such data ultimately provides the ability to transmit less power for equal performance.

With respect to the vector data 30 and the resulting state vectors, the modem 10 uses four rather than two dimensions to provide increased spacing between symbol states (for a four-state modulator). The spacing between symbol states is symmetrical as required for a random bit sequence, but the states lie on a sphere rather than a circle, as a QPSK modulator does. The tetrahedron spacing is chosen because it ensures that the closest distance between any two symbol states is the maximum possible distance for a given radius. The tetrahedron is placed in four dimensions rather than three to maintain a constant envelope signal at the output of the modulation system 50. In order to establish a four dimensional space, it is necessary to understand the concept of signal orthogonality. Two signals are considered orthogonal if:

$$\int_0^{Ts} s1(t) \cdot s0(t) dt = 0,$$

where Ts is the symbol period.

Since a symbol includes two data bits, the symbol period will be twice the bit period.

Generally, the vector data 30 is made up of four orthogonal unit vectors (i.e. the four dimensions), and vector coefficients to describe a particular symbol state. It is preferred that the four unit vectors are defined as:

$i=\cos(\omega t)$ $j=\sin(\omega t)$ $k=\text{clk}(t)*\cos(\omega t)$ $l=\text{clk}(t)*\sin(\omega t)$ where:

$$\text{clk}(t) = 1 \text{ for } 0 < t < Ts/2$$
$$= -1 \text{ for } Ts/2 < t < Ts$$

Clk(t) therefore represents the symbol clock function, "ω" represents the carrier angular velocity and "t" represents the time parameter.

Once the four unit vectors are defined, coefficients are assigned to each of the unit vectors to map the symbol states in a tetrahedral geometry. Thus, a predetermined coefficient table is generated to dynamically link the input data to the vector coefficients that weight the unit vectors. For every two data bits the four vector coefficients, weighting each of the unit vectors, define the symbol vector that represents particular phase angles and transitions in the output waveform. In demodulation, the input signal's phase angles and transitions are coherently correlated to locally generated state vectors (again based on the vector coefficients), and an output data decision is made based on the best correlation match. For the four possible I and Q bit sequences, the modem 10 assigns the signal states as shown below:

TABLE 1

| State | I | Q | i | j | k | l |
|---|---|---|---|---|---|---|
| 1 | 0 | 0 | 0 | 0 | 0 | 1 |
| 2 | 0 | 1 | $\frac{\sqrt{2}}{3}$ | $\frac{2}{3}$ | $\frac{\sqrt{2}}{3}$ | $-\frac{1}{3}$ |
| 3 | 1 | 0 | $\frac{\sqrt{2}}{3}$ | $-\frac{2}{3}$ | $-\frac{\sqrt{2}}{3}$ | $-\frac{1}{3}$ |
| 4 | 1 | 1 | $-\frac{2}{3} \cdot \sqrt{2}$ | 0 | 0 | $-\frac{1}{3}$ |

Note that the above vector coefficients represent only one embodiment of the tetrahedron modem geometry. Thus, these coefficients can be selected such that the tetrahedron is rotated within the sphere, but the tetrahedron spacing is maintained. In fact, it is only necessary that certain geometric equations are satisfied. For example, note that the vector coefficients are selected such that a hypersphere equation is satisfied, where the hypersphere equation is defined by:

$$i^2+j^2+k^2+l^2=1$$

Furthermore, the vector coefficients can be selected such that a constant envelope equation is satisfied, where the constant envelope equation is defined by:

$$(i+k)^2+(j+l)^2=1$$

It is this feature that requires the vector space to be four rather than three dimensions to describe the tetrahedron. It will further be appreciated that the distance between any two states is found to be:

$$\sqrt{(i_m - i_n)^2 + (j_m - j_n)^2 + (k_m - k_n)^2 + (l_m - l_n)^2} = 2\sqrt{\frac{2}{3}}$$

where "m" and "n" are any two of the four state coefficients. This verifies that the vector states are spaced to form a tetrahedron.

Turning now to FIG. 4, it will be appreciated that the vector data maps onto the familiar two dimensional phasor diagram 32 as a waveform that has four possible states. Each state has a starting phase, which is indicated by the head of the arrow. The waveform remains at this phase for the first half of the symbol period, after which it transitions to the phase indicated by the tail of the arrow and stays there for the remainder of the symbol. This particular implementation of the modulation scheme has a total of six possible phase positions. The fact that each state contains a transition at the midpoint of its symbol helps the demodulation system to acquire and maintain bit synchronization. Also, since the phasor diagram is not symmetrical, there is no ambiguity between the symbols that needs to be resolved by the demodulation system.

FIG. 2 demonstrates that the modulation system 50 preferably has a state vector generator 52 for generating and selecting vector coefficients for a particular two bit data input sequence. A typical I/Q modulator 54 generates the output waveform based on the unit vectors and the selected vector coefficients. Specifically, a data source 12 supplies the input serial binary data to the modulation system 50 and is typically external to the unit. The demultiplexer 56 takes the serial data and creates "I" and "Q" channels. These are fed into the state vector generator 52 where the appropriate i, j, k, and l weighting functions are selected that represent the particular tetrahedral state (as shown in Table 1). The state vector generator 52 may simply be a "look up" table residing in a DSP, or may be built from logic integrated circuits (ICs), opamps, and discrete devices, etc. Using multipliers 84, the k and l coefficients are then multiplied by a bi-polar clock 68 (e.g. levels at ±1 volt) running at the symbol rate. The clock modulated k and l coefficients are then added to the i and j coefficients respectively by adders 86. These two sums are then input into the I/Q modulator 54. The modulator 54 includes an oscillator 58, a 90-degree phase shifter (or hybrid) 60 to obtain the quadrature local oscillation, two mixers 62, 64, and a summing amplifier (or power combiner) 66.

Turning now to FIG. 3, one embodiment of the demodulation system 70 is shown in greater detail. It can be seen that the demodulation system 70 has an I/Q demodulator 72 that downconverts the phase modulated waveform to baseband. It should also be noted that the input waveform is split between a carrier recovery phase lock loop (PLL) 74 and the demodulator 72. The carrier recovery PLL 74 acquires and tracks the modulated intermediate frequency (IF) carrier and outputs a reference to the demodulator 72. The demodulator 72 uses this reference to strip off the IF carrier and output quadrature components at baseband. The demodulator Q channel is fed to a bit synchronizer 76 to regenerate the symbol clock. The Q channel is chosen over the I channel for bit synchronization because the state vectors chosen for this implementation of the tetrahedron modem guarantee that the Q component has a transition during each symbol period.

Both I and Q outputs from the demodulator 72 are fed to a state vector Correlator 78. This circuitry attempts to correlate the baseband signal plus noise with locally generated copies of each state. The correlator 78 outputs are sampled at the end of each symbol period and routed to a state comparator module 80 to decide which locally generated state vector correlated best with the incoming waveform. The state comparator module 80 makes its decision based on a predetermined selection criteria (typically, the highest correlated energy level). The state comparator module 80 outputs the resulting symbol decision to a multiplexer 82 which samples each channel (i.e. I and Q) and reconstructs a single serial bit stream. It will be appreciated that the state vector correlator 78 generates energy levels representing how well the input signal matched (i.e. correlated) with each possible symbol state, and the state comparator module 80 selects the symbol state that correlated to the highest energy value.

The theoretical BER performance of the tetrahedron modem has been analyzed, and the algorithm to describe the exact BER is quite complex. By making some simplifying assumptions, however, an approximation can be made that leads to reasonably accurate results. This is especially true as the signal-to-noise ratio (SNR) increases. This algorithm is not valid for lower SNR's, but errs on the side that makes the modem performance appear worse than it actually is. The equation that gives the approximate BER of the tetrahedron modem for large Eb/No (Eb=energy per bit, No=noise spectral density) is:

$$\text{TETRA\_BER} := 1 - \frac{\sqrt{2 \cdot c}}{\sqrt{\pi}} \cdot \int_{-\sqrt{\frac{2}{3}}}^{\sqrt{\frac{2}{3}}} e^{-\xi^2 \cdot 2 \cdot c} d\xi$$

where: $c = 10^{(Eb/No)/10}$

Further, the equation that gives the theoretical probability of error for a BPSK signal is:

$$\text{BPSK\_BER} := \frac{1 - \frac{\sqrt{c}}{\sqrt{\pi}} \cdot \int_{-1}^{1} e^{-\xi^2 \cdot c} d\xi}{2}$$

again: $c = 10^{(Eb/No)/10}$

Figure 5:
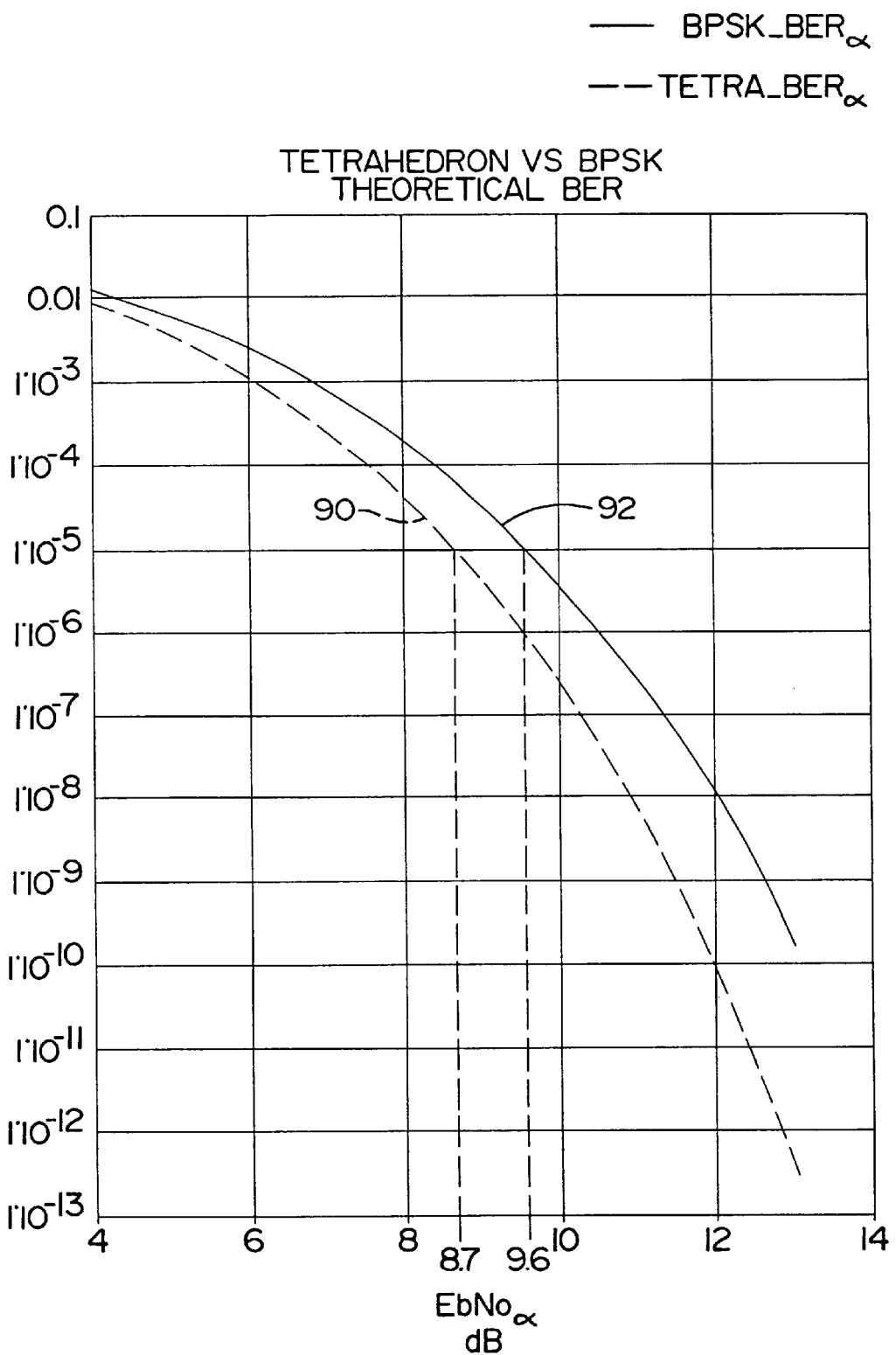
FIG. 5 is a plot demonstrating theoretical bit error rate performance of the tetrahedron modem of the present invention in comparison to a theoretical BPSK modem.

FIG. 5 demonstrates the result of evaluating and graphing the above equations using "Mathcad" (product of MathSoft, Inc.). It can be seen that the tetrahedron modem curve 90 requires an Eb/No of 8.7 dB to obtain a $10^{-5}$ bit error rate. This compares to 9.6 dB for similar theoretical BPSK performance as indicated by the BPSK curve 92.

As shown in FIG. 6, the tetrahedron modem was simulated on a communications software package called "SystemView", available from Elanix, Inc. The SystemView model provided verification of the tetrahedron modem's constant amplitude waveform and its spectrum. "Gaussian noise" was added in this model to the modulated signal at various SNR levels. The demodulator output was compared to the data actually sent in a BER test. The simulation also exposed a BPSK modem to the same input data stream and noise levels for comparison. It can be seen that the simulated tetrahedron modem curve 94 and the simulated BPSK modem curve 96 agree well with the theoretical curves found in FIG. 5.

Many applications require data transfer over satellite or airborne systems. These platforms typically have strict size, weight, and power limits in addition to their communication requirements. The benefits of the tetrahedron modem enable operation of a communication link at the required BER with lower transmitted power. This reduction in transmitted power can translate into the use of smaller, lighter, high power amplifiers (HPA's) or antennas without sacrificing performance. In addition to the cost benefits, the ability to transmit less power for equal performance is especially valuable for stealthy vehicles where minimizing emissions is a primary concern.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for phase modulating data, the method including the steps of:

defining a plurality of dimensions for modulating the binary data, the plurality of dimensions defining an output waveform signal space;

defining a state vector set such that the state vectors in the state vector set form a tetrahedron in four dimensional space; and converting the data into phase angles and transitions based on the state vector set.

2. The method of claim 1 further including the steps of:

defining predetermined unit vectors for the state vector set;

generating a predetermined coefficient table, the predetermined coefficient table linking the data to vector coefficients for the predetermined unit vectors; and selecting the vector coefficients from the predetermined coefficient table based on a sequence of the data.

3. The method of claim 2 further including the step of defining one of the unit vectors to be $\cos(\omega t)$, where $\omega$ represents an angular velocity and t represents a time parameter.

4. The method of claim 2 further including the step of defining one of the unit vectors to be $\sin(\omega t)$, where $\omega$ represents an angular velocity and t represents a time parameter.

5. The method of claim 2 further including the step of defining one of the unit vectors to be $\text{clk}(t)$ multiplied by $\cos(\omega t)$, where $\text{clk}(t)$ represents a symbol clock function, $\omega$ represents an angular velocity and t represents a time, parameter.

6. The method of claim 2 further including the step of defining one of the unit vectors to be $\text{clk}(t)$ multiplied by $\sin(\omega t)$, where $\text{clk}(t)$ represents a symbol clock function, $\omega$ represents an angular velocity and t represents a time parameter.

7. The method of claim 2 further including the step of selecting the vector coefficients such that a hypersphere equation is satisfied, the hypersphere equation defined by $i^2+j^2+k^2+l^2=1$, where i, j, k and l represent the vector coefficients.

8. The method of claim 7 further including the step of selecting the vector coefficients such that a constant envelope equation is satisfied, the constant envelope equation defined by $(i+k)^2+(j+l)^2=1$.

9. The method of claim 8 further including the step of selecting the coefficient table to be:

| State | I | Q | i | j | k | l |
|---|---|---|---|---|---|---|
| 1 | 0 | 0 | 0 | 0 | 0 | 1 |
| 2 | 0 | 1 | $\frac{\sqrt{2}}{3}$ | $\frac{2}{3}$ | $\frac{\sqrt{2}}{3}$ | $-\frac{1}{3}$ |
| 3 | 1 | 0 | $\frac{\sqrt{2}}{3}$ | $-\frac{2}{3}$ | $-\frac{\sqrt{2}}{3}$ | $-\frac{1}{3}$ |
| 4 | 1 | 1 | $-\frac{2}{3}\cdot\sqrt{2}$ | 0 | 0 | $-\frac{1}{3}$ | where I and Q represent two sequential data bits.

10. The method of claim 1 further including the step of generating an output waveform, the output waveform being phase modulated based on the state vector set.

11. A method for demodulating a phase modulated waveform, the method including the steps of:

creating a plurality of dimensions for detection of the waveform, the plurality of dimensions matching a signal space of the waveform;

defining a state vector set such that the state vectors in the state vector set form a tetrahedron in four dimensional space; and converting the phase modulated waveform into binary data based on the state vector set.

12. The method of claim 11 further including the steps of:

defining predetermined unit vectors for the state vector set; and generating a predetermined coefficient table, that the predetermined coefficient table specifying possible weightings for the predetermined unit vectors.

13. The method of claim 12 further including the step of correlating the phase modulated waveform to locally generated state vectors defined by the unit vectors and the vector coefficients.

14. The method of claim 12 further including the steps of:

defining one of the unit vectors to be $\cos(\omega t)$, where $\omega$ represents an angular velocity and t represents a time parameter;

defining one of the unit vectors to be $\sin(\omega t)$;

defining one of the unit vectors to be $\text{clk}(t)$ multiplied by $\cos(\omega t)$, where $\text{clk}(t)$ represents a symbol clock function; and defining one of the unit vectors to be $\text{clk}(t)$ multiplied by $\sin(\omega t)$.

15. The method of claim 12 further including the step of selecting the coefficient table to be:

| State | I | Q | i | j | k | l |
|---|---|---|---|---|---|---|
| 1 | 0 | 0 | 0 | 0 | 0 | 1 |
| 2 | 0 | 1 | $\frac{\sqrt{2}}{3}$ | $\frac{2}{3}$ | $\frac{\sqrt{2}}{3}$ | $-\frac{1}{3}$ |
| 3 | 1 | 0 | $\frac{\sqrt{2}}{3}$ | $-\frac{2}{3}$ | $-\frac{\sqrt{2}}{3}$ | $-\frac{1}{3}$ |

| State | I | Q | i | j | k | l |
|---|---|---|---|---|---|---|
| 4 | 1 | 1 | $-\frac{2}{3}\cdot\sqrt{2}$ | 0 | 0 | $-\frac{1}{3}$ | where I and Q represent two sequential data bits.

16. The method of claim 11 further including the step of generating serial binary data, based on a best correlation match of locally generated state vectors to the phase modulated waveform.

17. A modem comprising:
   a modulation system for converting input data into a phase modulated output waveform based on a state vector set; and
   a demodulation system for converting a phase modulated input waveform into output data based on the state vector set;
   said state vectors forming a tetrahedron in four dimensional space.

18. The modem of claim 17 wherein the modulation system includes:
   a state vector generator for generating vector coefficients for a plurality of predetermined unit vectors, the vector coefficients and the predetermined unit vectors defining the state vector set; and
   a modulator for generating the output waveform based on the predetermined unit vectors and the vector coefficients.

19. The modem of claim 17 wherein the demodulation system includes:
   a demodulator for defining a plurality of dimensions to match the four dimensional space, the four dimensional space allowing proper coherent detection of the input waveform;
   a state vector correlator for correlating the input waveform with locally generated state vectors; and
   a state comparator module for generating the output data based on the state vector that provides a best correlation match to the input waveform.

20. The modem of claim 19 wherein the state vector correlator generates energy levels that represent correlation values of the input waveform to the locally generated state vectors, and the state comparator module selects the locally generated state vector with a highest energy level.

* * * * *